(12) United States Patent
Polsky et al.

(10) Patent No.: US 8,666,848 B1
(45) Date of Patent: Mar. 4, 2014

(54) CONTINUOUS PLANNING REVIEW SYSTEM

(75) Inventors: Joanne J M Polsky, Seattle, WA (US);
Andrew K. Samnick, Seattle, VA (US);
Wesley S. Rosenblum, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/252,719

(22) Filed: Oct. 4, 2011

(51) Int. Cl.
*G06Q 30/00* (2012.01)

(52) U.S. Cl.
USPC ............................................ 705/28; 705/7.12

(58) Field of Classification Search
USPC .......... 705/26, 28, 16, 26.2, 29; 235/379, 380
See application file for complete search history.

(56) References Cited

U.S. PATENT DOCUMENTS

| | | | |
|---|---|---|---|
| 5,237,496 A | 8/1993 | Kagami et al. | |
| 5,570,291 A | 10/1996 | Dudle et al. | |
| 5,608,621 A | 3/1997 | Caveney et al. | |
| 5,615,109 A | 3/1997 | Eder | |
| 5,630,070 A | 5/1997 | Dietrich et al. | |
| 5,870,733 A | 2/1999 | Bass et al. | |
| 5,953,707 A * | 9/1999 | Huang et al. | 705/7.25 |
| 5,963,919 A | 10/1999 | Brinkley et al. | |
| 6,044,356 A | 3/2000 | Murthy et al. | |
| 6,154,728 A | 11/2000 | Sattar et al. | |
| 6,341,269 B1 | 1/2002 | Dulaney et al. | |
| 6,366,890 B1 | 4/2002 | Usrey | |
| 6,397,226 B1 | 5/2002 | Sage | |
| 6,516,301 B1 | 2/2003 | Aykin | |
| 6,631,413 B1 | 10/2003 | Aggarwal et al. | |
| 6,671,673 B1 | 12/2003 | Baseman et al. | |
| 6,754,637 B1 | 6/2004 | Stenz | |
| 6,757,689 B2 | 6/2004 | Battas et al. | |
| 6,826,538 B1 | 11/2004 | Kalyan et al. | |
| 6,834,266 B2 | 12/2004 | Kumar et al. | |
| 6,836,773 B2 | 12/2004 | Tamayo et al. | |
| 6,845,909 B2 | 1/2005 | Bong et al. | |
| 6,847,934 B1 | 1/2005 | Lin et al. | |
| 6,868,397 B1 | 3/2005 | Mccaslin | |
| 6,910,017 B1 | 6/2005 | Woo et al. | |
| 6,925,642 B1 | 8/2005 | Commander | |

(Continued)

FOREIGN PATENT DOCUMENTS

EP 770967 A2 * 5/1997

OTHER PUBLICATIONS

John T Blake, Michael W Carter, A goal programming approach to strategic resource allocation in acute care hospitals, European Journal of Operational Research. Amsterdam: Aug. 1, 2002. vol. 140, Iss. 3; p. 541 (Attached).*

(Continued)

*Primary Examiner* — Matthew Gart
*Assistant Examiner* — Rokib Masud
(74) *Attorney, Agent, or Firm* — Robert C. Kowert; Meyertons, Hood, Kivlin, Kowert & Goetzel, P.C.

(57) ABSTRACT

Systems and methods for inventory planning. In some embodiments, automated real-time replenishment planning is provided based on business inputs, such as vendor order-processing schedules. To this end, continuous inventory review of target inventory positions is performed to automatically derive inventory replenishment frequencies and corresponding buying schedules. Such systems and methods may increase efficiency by decoupling the generation of inventory replenishment plans and the execution of the generated inventory replenishment plans.

21 Claims, 5 Drawing Sheets

(56) References Cited

U.S. PATENT DOCUMENTS

| | | |
|---|---|---|
| 6,931,347 B2 | 8/2005 | Boedi et al. |
| 6,976,001 B1 | 12/2005 | Levanoni et al. |
| 7,069,234 B1 | 6/2006 | Cornelius et al. |
| 7,092,929 B1 | 8/2006 | Dvorak et al. |
| 7,124,941 B1 | 10/2006 | O'connell |
| 7,133,848 B2 | 11/2006 | Phillips et al. |
| 7,146,327 B1 | 12/2006 | Howard et al. |
| 7,212,976 B2 | 5/2007 | Scheer |
| 7,228,287 B1 | 6/2007 | Samson et al. |
| 7,231,354 B1 | 6/2007 | Rooks et al. |
| 7,236,949 B2 | 6/2007 | Natan et al. |
| 7,251,611 B2 | 7/2007 | Abbott et al. |
| 7,313,532 B2 | 12/2007 | Mariamova et al. |
| 7,337,031 B1 | 2/2008 | Birjandi et al. |
| 7,437,308 B2 | 10/2008 | Kumar et al. |
| 7,437,323 B1 | 10/2008 | Valkov et al. |
| 7,543,743 B1 | 6/2009 | Yu et al. |
| 7,607,577 B1 | 10/2009 | Yu et al. |
| 7,627,493 B1 | 12/2009 | Sarthi et al. |
| 7,676,404 B2 | 3/2010 | Richard et al. |
| 7,720,779 B1 | 5/2010 | Perry et al. |
| 7,881,986 B1 | 2/2011 | Pape et al. |
| 7,912,748 B1 | 3/2011 | Rosenberg et al. |
| 8,055,520 B2 | 11/2011 | Baumann et al. |
| 8,209,242 B1 * | 6/2012 | Henderson et al. ............ 705/28 |
| 8,447,664 B1 | 5/2013 | Pape et al. |
| 2001/0041999 A1 | 11/2001 | Young et al. |
| 2001/0047293 A1 | 11/2001 | Waller et al. |
| 2002/0019759 A1 | 2/2002 | Arunapuram et al. |
| 2002/0042819 A1 | 4/2002 | Reichert et al. |
| 2002/0043669 A1 * | 4/2002 | Kobayashi et al. ........... 257/207 |
| 2002/0069079 A1 | 6/2002 | Vega |
| 2002/0072988 A1 * | 6/2002 | Aram ............................ 705/26 |
| 2002/0072999 A1 | 6/2002 | Andres et al. |
| 2002/0099631 A1 | 7/2002 | Vanker et al. |
| 2002/0116348 A1 | 8/2002 | Phillips et al. |
| 2002/0120395 A1 | 8/2002 | Smith |
| 2002/0133325 A1 | 9/2002 | Hoare, II et al. |
| 2002/0143669 A1 * | 10/2002 | Scheer ........................... 705/28 |
| 2002/0147630 A1 | 10/2002 | Rose et al. |
| 2002/0147666 A1 | 10/2002 | Baseman et al. |
| 2002/0147767 A1 | 10/2002 | Brice et al. |
| 2002/0156684 A1 | 10/2002 | Stone et al. |
| 2002/0178077 A1 | 11/2002 | Katz et al. |
| 2003/0004750 A1 | 1/2003 | Teraoka et al. |
| 2003/0009410 A1 | 1/2003 | Ramankutty et al. |
| 2003/0009416 A1 | 1/2003 | Mara |
| 2003/0018513 A1 | 1/2003 | Hoffman et al. |
| 2003/0028457 A1 | 2/2003 | Costa et al. |
| 2003/0033179 A1 | 2/2003 | Katz et al. |
| 2003/0046156 A1 | 3/2003 | Cromer et al. |
| 2003/0074251 A1 | 4/2003 | Kumar et al. |
| 2003/0078850 A1 | 4/2003 | Hartman et al. |
| 2003/0101107 A1 | 5/2003 | Agarwal et al. |
| 2003/0130966 A1 | 7/2003 | Thompson et al. |
| 2003/0149578 A1 | 8/2003 | Wong |
| 2003/0195791 A1 | 10/2003 | Waller et al. |
| 2003/0216969 A1 | 11/2003 | Bauer et al. |
| 2003/0233246 A1 | 12/2003 | Snapp et al. |
| 2004/0039664 A1 | 2/2004 | Natan et al. |
| 2004/0059627 A1 | 3/2004 | Baseman et al. |
| 2004/0068459 A1 | 4/2004 | Goulet et al. |
| 2004/0161131 A1 | 8/2004 | Rhoads |
| 2004/0172321 A1 | 9/2004 | Vemula et al. |
| 2004/0172341 A1 | 9/2004 | Aoyama et al. |
| 2004/0199397 A1 | 10/2004 | Dresden |
| 2004/0215544 A1 | 10/2004 | Formale et al. |
| 2004/0249711 A1 | 12/2004 | Walker et al. |
| 2005/0033706 A1 | 2/2005 | Krikler et al. |
| 2005/0034062 A1 | 2/2005 | Bufkin et al. |
| 2005/0107988 A1 | 5/2005 | Mohammed et al. |
| 2005/0131779 A1 | 6/2005 | Kitamura et al. |
| 2005/0154630 A1 | 7/2005 | Lin et al. |
| 2005/0259683 A1 | 11/2005 | Bishop et al. |
| 2005/0270288 A1 | 12/2005 | Arcas |
| 2005/0276440 A1 | 12/2005 | Rhoads et al. |
| 2006/0028234 A1 | 2/2006 | Marino et al. |
| 2006/0069598 A1 * | 3/2006 | Schweitzer et al. ............ 705/8 |
| 2006/0122881 A1 | 6/2006 | Walker et al. |
| 2006/0150189 A1 | 7/2006 | Lindsley |
| 2006/0161504 A1 | 7/2006 | Walser et al. |
| 2006/0282346 A1 | 12/2006 | Kernodle et al. |
| 2007/0104378 A1 | 5/2007 | Aguera |
| 2007/0116325 A1 | 5/2007 | Rhoads et al. |
| 2007/0143157 A1 | 6/2007 | Sussman et al. |
| 2007/0204226 A1 | 8/2007 | Hindi et al. |
| 2007/0270990 A1 | 11/2007 | Katircioglu et al. |
| 2008/0016472 A1 | 1/2008 | Rohlf et al. |
| 2008/0147486 A1 | 6/2008 | Wu |
| 2009/0125385 A1 | 5/2009 | Landvater |
| 2009/0187468 A1 | 7/2009 | Krech |
| 2009/0240544 A1 | 9/2009 | Cheng et al. |
| 2010/0138273 A1 | 6/2010 | Bateni et al. |
| 2010/0205039 A1 | 8/2010 | Basak et al. |
| 2010/0312611 A1 | 12/2010 | Henderson et al. |
| 2012/0054076 A1 | 3/2012 | Wu et al. |
| 2012/0075858 A1 | 3/2012 | Hsieh et al. |
| 2012/0173304 A1 | 7/2012 | Hosoda et al. |

OTHER PUBLICATIONS

Benjamin W Wah and Tao Wang, "Simulated Annealing with Asymptotic Convergence for Nonlinear Constrained Global Optimization," 2004, pp. 1-15.

Benjamin W. Wah, et al., "Hybrid Constrained Simulated Annealing and Genetic Algorithms for Nonlinear Constrained Optimization," 2001, pp. 1-8.

Benjamin W. Wah, et al., "The Theory of Discrete Lagrange Multipliers for Nonlinear Discrete Optimization," Research supported by National Science Foundation Grant NSF MIP 96-32316. Principles and Practice of Constraint Programming, Springer-Verlag, Oct. 1999, pp. 28-42.

Benjamin W. Wah, et al., "Constrained Genetic Algorithms and their Applications in Nonlinear Constrained Optimization," Proc. 12th International Conference on Tools with ArticialIntelligence, Nov. 2000, pp. 1-8.

Benjamin W. Wah, et al., "Simulated annealing with asymptotic convergence for nonlinear constrained optimization," I Accepted: Oct. 16, 2006, © Springer Science+Business Media B.V. 2006, pp. 1-37.

Zhe Wu, "The Theory and Applications of Discrete Constrained Optimization Using Lagrange Multipliers," pp. 1-221, 2000.

SellerEngine FAQ, Feb. 2005, downloaded from http://web.archive.org/web20050220024916/www.sellerengine.com/faq.htm, pp. 1-5.

SellerEngine general overview, Feb. 2005, downloaded from http://web.archive.org/web/20050222005850/http:1/www.sellerengine.com/SellerEng ine.htm, pp. 1-3.

SellerEngine product overview, Feb. 2005, downloaded from http:/web.archive.org/web/20050121 013225/www.sellersengine.com/trialguide.htm, pp. 1-2.

Fillz FAQ, Feb. 2005, downloaded from http://web.archive.org/web/20050212084321 /http://www.fillz.com/faq/cc_inventory, pp. 1-3.

Vendio Overview, Feb. 2005, downloaded from http://web.archive.or/web/200502081 03009/http:/ /www. vendio.com/my/smpp/feature matrix.html, pp. 1-3.

ScoutPal Overview, Feb. 2005, downloaded from http://web.archive.org/web/2005021 0151425/http://www.scoutpal.com/, 1 page.

Nahmias, Steven (1979), "Simple Approximations for a Variety of Dynamic Leadtime Lost-Sales Inventory Models," Operations Research, val. 27 (5), pp. 904-924.

Schneider, Helmut (1891 ), "Effect of Service-Levels on Order-Points or Order-Levels in Inventory Models," International Journal on Production Research, val. 19 (6), pp. 615-631.

Vendio Feature Matrix, Feb. 2005, downloaded from http://web.archive.org/web/200502081 03009/http:/ /www.vendio. com/my/smpp/feature matrix.html, pp. 1-3.

(56) References Cited

OTHER PUBLICATIONS

U.S. Appl. No. 13/172,720, filed Jun. 29, 2011, Jason W. Murray.
U.S. Appl. No. 13/172,733, filed Jun. 29, 2011, Eric M. Mack, et al.
U.S. Appl. No. 12/428,982, filed Apr. 23, 2009, Tolga Cezik, et al.
U.S. Appl. No. 13/211,158, filed Aug. 16, 2011, Aniket Ajit Prabhune, et al.
U.S. Appl. No. 13/172,726, filed Jun. 29, 2011, Jason W. Murray, et al.
U.S. Appl. No. 13/524,897, filed Jun. 15, 2012, Fedor Zhdanov, et al.
U.S. Appl. No. 12/398,602, filed Mar. 3, 2009, Qaseem Shaikh, et al.
U.S. Appl. No. 12/981,382, filed Dec. 29, 2010, Maomao Chen et al.

* cited by examiner

CONTINUOUS PLANNING REVIEW SYSTEM

BACKGROUND

In order to offer customers a wide selection of items readily available for delivery, a merchant (whether engaging in electronic or conventional "brick and mortar" commerce) may hold various quantities of such items within one or more inventory facilities. Keeping items in inventory may serve to buffer variations in customer demand, or in a manufacturer or distributor's ability to supply various items. For example, different items offered for sale by the merchant may have different manufacturer or vendor lead times. Holding quantities of such items in inventory may enable the merchant to offer a more consistent availability of these items to customers.

As part of its operations, a merchant will generally attempt to ensure that its inventory on hand is sufficient to cover expected customer order volumes for a particular period of time. Typically, these techniques focus on making sure that there is enough inventory on hand to meet projected demand. However, storing inventory is not without expenses. For example, providing and maintaining a physical facility in which to store the inventory presents recurring infrastructure costs directly attributable to the inventory items stored in the facility. Further, while items are in storage awaiting sale, debt or capital costs associated with the items may accumulate. Items being held in inventory may also depreciate, become obsolete, expire or spoil (e.g., in the case of perishable items), become damaged, etc.

When these various types of inventory holding costs are taken into account, storing too much inventory can present financial concerns. To address these concerns, merchants may employ optimization strategies for inventory management and replenishment planning. Such strategies may attempt to ensure that the merchant purchases and stocks just the right amount of inventory at the right time to satisfy demand, thus minimizing associated costs. These optimization strategies may include ordering smaller replenishment quantities at more frequent intervals in order to minimize inventory-holding costs.

However, merchants attempting to benefit from utilizing more frequent replenishment intervals may face various constraints imposed by the merchants' vendors. For example, a particular vendor may process received orders for an inventory item only at certain specific times (e.g., every Monday and Wednesday at 10 AM), thereby defining the maximum frequency at which the merchant may effectively place replenishment orders. Thus, it may be beneficial to account for vendor-imposed constraints in order to more accurately capture possible replenishment frequencies and planning intervals. Additional challenges may be encountered in cases where a vendor my occasionally change the constraints (e.g., the vendor changes the order processing frequencies and/or times).

Specific embodiments are shown by way of example in the drawings and will be described herein in detail. It should be understood, however, that the drawings and detailed description are not intended to limit the claims to the particular embodiments disclosed, even where only a single embodiment is described with respect to a particular feature. On the contrary, the intent is to cover all modifications, equivalents and alternatives falling within the spirit and scope of the present invention as defined by the appended claims. Examples of features provided in the disclosure are intended to be illustrative rather than restrictive unless stated otherwise.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. §112, paragraph six, interpretation for that component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

Various embodiments of systems and methods for inventory planning are disclosed. In some embodiments described herein, automated real-time inventory replenishment planning is provided based on business inputs, such as vendor order-processing schedules. To this end, continuous event-driven inventory review of target inventory positions is employed to automatically derive inventory replenishment frequencies and corresponding buying schedules. Such systems and methods may increase efficiency by decoupling the evaluation of inventory replenishment planning and the execution of inventory replenishment plans.

Accordingly, in some embodiments, a method may include automatically scheduling an inventory planning request for a particular inventory item. The scheduling may be performed in response to receiving an indication of one or more inventory requirement triggers (e.g., events). In some cases, the scheduling may be further based on one or more vendor criteria (e.g., vendor-defined deadlines for processing orders) associated with the particular inventory item.

Some embodiments include automatically generating a particular inventory replenishment plan for the particular inventory item, in accordance with the scheduled inventory planning request. This generating may in some instances be based on a current inventory position (e.g., ability to meet future demand) of the particular inventory item. Various embodiments may include storing the particular inventory replenishment plan and, in some instances, executing the particular inventory replenishment plan to cause an order for the particular inventory item to be sent to a vendor, or to a plurality of vendors.

The executing of the particular inventory replenishment plan may in some cases include aggregating the particular inventory replenishment plan and one or more other inventory replenishment plans (e.g., other inventory replenishment plans directed to other inventory items, such as different, related inventory items belonging to a same product group). In some embodiments, executing the particular inventory replenishment plan may include determining whether adjustment of the particular inventory replenishment plan is required based on aggregation of the particular inventory replenishment plan and the one or more other inventory replenishment plans (e.g., due to the aggregation exceeding inventory receiving capabilities).

As used herein, the term "merchant" includes any entity capable of conducting and/or fulfilling a sales transaction in response to an actual or expected order or request. Typically, a merchant may present or offer various products or items to its customers, as well as information about those items (e.g., availability and pricing information, product details, images, etc.) that facilitate a sale. For example, a retail enterprise that generally sells merchandise to end consumers (e.g., not generally intended for resale as new) may sell through an online, web-based channel that may include an online catalog or portal configured to display information about items or products, a web-based order entry system such as a virtual shopping cart or other system, a status tracking tool through which customers may track the status or progress of orders, a search engine, and any of a number of other features suitable for promoting and performing sales transactions. Merchants may also engage in transactions using other types of sales channels. For example, a merchant may employ a mail-order catalog channel, where customers may receive information about items or products via a mailed catalog and make orders using paper forms and/or via telephone. Additionally or alternatively, a merchant may have a physical (i.e., "brick-and-mortar") store, through which customers may receive information about products and order or purchase those products in person. In various cases, all or some portion of the aforementioned channels may be operated by the particular retail enterprise, or by a third party (e.g., another merchant).

As used herein, the term "fulfillment center" includes any inventory storage facility such as, for example, warehouses, repositories, depositories, stockrooms, storehouses, distribution centers, material handling facilities, or the like.

Inventory Management Systems

Figure 1:
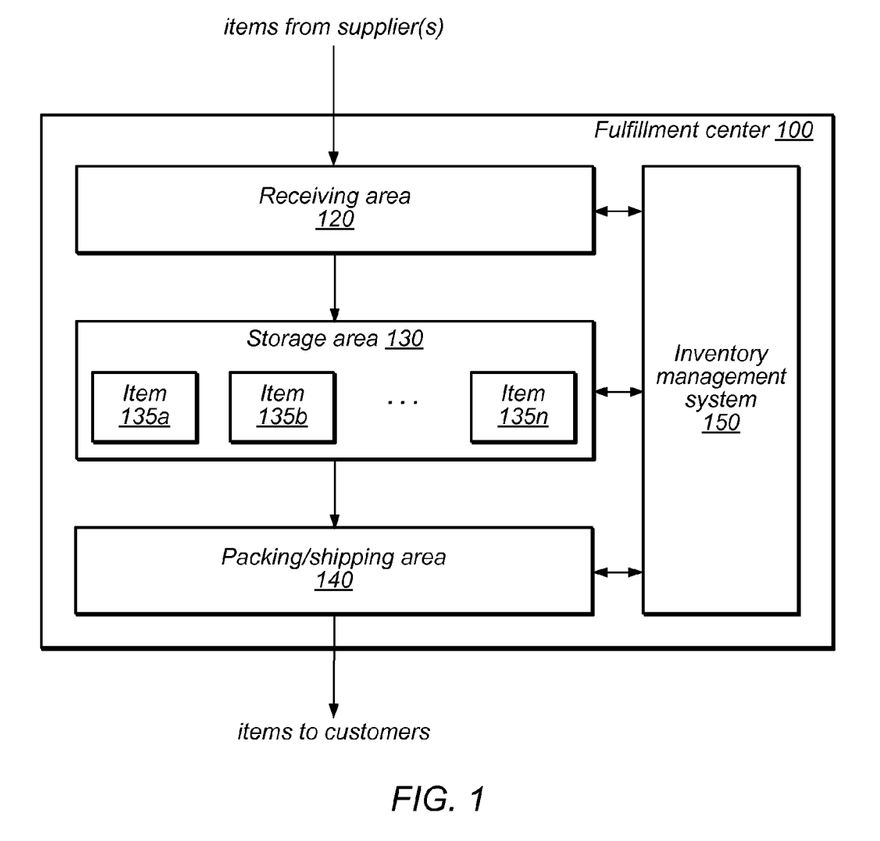
FIG. 1 is a block diagram of a fulfillment center according to some embodiments of the present disclosure.

In order to offer its customers a wider variety of items that are readily available for delivery, a merchant may store various quantities of such items within one or more fulfillment centers. An embodiment of one such fulfillment center is shown in FIG. 1. As illustrated, fulfillment center 100 includes receiving area 120, storage area 130 configured to store an arbitrary number of items or products 135*a-n*, and packing/shipping area 140. The arrangement of the various areas within the illustrated embodiment of fulfillment center 100 is depicted functionally rather than schematically. For example, in some embodiments, it is noted that multiple different receiving areas 120, storage areas 130, and packing/shipping areas 140 may be interspersed rather than segregated. Additionally, fulfillment center 100 includes an inventory management system 150 configured to interact with each of receiving area 120, storage area 130 and packing/shipping area 140.

Fulfillment center 100 may be configured to receive different kinds of items 135 from various suppliers, and to store them until a customer order specifying particular ones of items 135 is received. The particular items 135 may then be selected from storage and sent to the customer. The general flow of items through fulfillment center 100 is indicated using arrows. Specifically, in the illustrated embodiment, items 135 may be received from one or more suppliers, such as manufacturers, distributors, wholesalers, etc. at receiving area 120. In various embodiments, items 135 may include merchandise, commodities, perishables, or any suitable type of item depending on the nature of the merchant or enterprise that operates fulfillment center 100. Upon being received from a supplier at receiving area 120, items 135 may be prepared for storage. For example, in some embodiments items 135 may be unpacked or otherwise rearranged, and inventory management system 150 (which, as described below, may include one or more software applications executing on a computer system) may be updated to reflect the type, quantity, condition, cost or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135 such as bulk products, commodities, etc. may be stored in continuous or arbitrarily divisible amounts that may not be inherently organized into countable units. Such items 135 may be managed in terms of measurable quantities such as units of length, area, volume, weight, time duration or other dimensional properties characterized by units of measurement. Generally speaking, a quantity of an item 135 may refer to either a countable number of individual or aggregate units of an item 135 or a measurable amount of an item 135, as appropriate.

After arriving through receiving area 120, items 135 may be stored within storage area 130. In some embodiments, like items 135 may be stored together in bins, on shelves or via other suitable storage mechanisms, such that all items 135 of a given kind are stored in one location. For example, items having a common Universal Product Code (UPC), Stock-Keeping Unit (SKU) code, or other designation (including proprietary designations) may be stored together. In other embodiments, like items 135 may be stored in different locations. For example, to optimize retrieval of certain items 135 having high turnover within a large physical facility, those items 135 may be stored in several different locations to reduce congestion that might occur at a single point of storage.

When a customer order specifying one or more of items 135 is received, the corresponding items 135 may be selected or "picked" from storage area 130. In various embodiments, item picking may range from minimally automated to completely automated picking. For example, in one embodiment fulfillment center employees may pick items 135 using written or electronic pick lists derived from customer orders, while in another embodiment conveyor belts and robotics may be used to pick and transfer items 135. After the items 135 corresponding to a particular order are picked, they may be processed at packing/shipping area 140 for delivery to the customer. For example, items may be packaged for shipment to the customer using a common carrier, or simply bagged or otherwise prepared for direct transfer to a customer, e.g., at an order pickup counter. In some embodiments, further interaction with inventory management system 150 may occur when items 135 are picked from storage area 130 and/or processed at packing/shipping area 140, for example to update inventory records to reflect the removal of inventory, to record revenue for the sale or other transaction (e.g., lease, rental, exchange, etc.) and so forth.

The organization and operation of fulfillment center 100 described above is given as an example. In other embodiments, a fulfillment center 100 may be arranged differently and operate differently than described above. For example, some embodiments of fulfillment center 100 may not have a dedicated receiving area 120. In such embodiments received items may be place directly into bins in storage area 130. In general, fulfillment center 100 may employ any organization and operational flow for handling inventory and fulfilling orders.

Generally speaking, the level of inventory of a given item 135 may affect the quality of service associated with providing the given item to a customer. Quality of service may encompass factors such as general availability and selection of items 135, timeliness of order completion, or any other factors relevant to a customer's perceived experience in conducting business relating to items 135. As an example of the interaction between inventory levels and quality of service, if a particular item 135 ordered by a customer is not in stock within fulfillment center 100, the customer may be forced to wait for delivery until that particular item 135 can be obtained, or the customer may cancel the order resulting in a lost sale. Consequently, keeping a number of units of items 135 on hand may assist in the timely fulfillment of orders and increase customer satisfaction. A larger inventory, for example, may more readily accommodate unexpected increases in customer demand.

However, various costs are typically associated with holding items 135 in storage for any period of time. In some embodiments, holding a unit of an item 135 in storage within storage area 130 may incur incremental storage costs. For example, the cost of providing fulfillment center 1000 in which items 135 may be stored may include recurring real estate costs (e.g., lease costs, debt service, etc.), personnel costs, facilities costs (e.g., utilities, maintenance, etc.) and any other costs associated with fulfillment center 100. In an embodiment, such costs may be incrementally apportioned to a given unit of an item 135 according to an area or volume of storage space occupied by that unit. For example, storage costs may be applied to each unit of each item 135 at a rate of dollars per square/cubic foot of item volume per unit of storage time (day, week, month, etc.). In other embodiments, different cost allocation methods may be employed. For example, in an embodiment the costs of providing special storage or handling, such as refrigeration, controlled atmosphere, etc. may exclusively be allocated to those items 135 that require such measures, rather than averaging those costs across all items 135. Similarly, in an embodiment, storage may include temporary capacity (e.g., short-term leased space, seasonal overflow capacity, etc.) as well as permanent capacity (e.g., owned space, year-round capacity, etc.), each of which may have different cost characteristics. Correspondingly, in some such embodiments items 135 stored within a particular type of facility may exclusively incur costs of the particular type of facility according to their storage utilization (e.g., area, volume, etc.). Alternatively, storage costs may be allocated to items 135 based upon their value or sales volume as opposed to their size. In some embodiments, additional costs associated with obtaining a given item 135, such as transportation/handling costs charged by a supplier or incurred by eventual shipment to a customer, may be included within storage costs for that given item 135.

In addition to storage costs, holding a unit of an item 135 in storage may also result in capital or economic costs related to the price paid to obtain the item. That is, once working capital or cash flow is committed to a unit of an item 135 (e.g., once that unit is paid for), that economic value is not available for other purposes; the committed value is "tied up" in the corresponding inventory. Depending on the accounting scheme used to manage the costs of inventory, a cost of debt or other time-value-of-money cost (also referred to as an economic cost) may be associated with the price paid for a given unit of an item 135. For example, in an embodiment an effective annual interest rate of 6% may be applied to the price paid for a unit of inventory and may continue to accrue until that unit is sold or otherwise disposed of. In some cases, economic costs may be applied to storage costs in addition to the price paid for a unit of inventory. Further, negative economic costs may also be associated with units of items 135. For example, a supplier may offer a rebate for an item 135 that effectively reduces its cost.

Other types of costs may also be associated with holding units of items 135 in storage. For example, in the ordinary course of operation of fulfillment center 100, items 135 may be subject to loss or damage due to accidents or mishaps. A rate of loss, or a corresponding rate of insurance against such loss, may be included within an overall cost of holding a unit of an item 135. In some embodiments, two or more of the costs described herein may be combined or added to make up an item's holding cost. In some cases, such holding costs may be expressed as a fixed dollar amount (e.g., $5.00). In other cases, holding costs may be expressed as a dollar amount over a period of time (e.g., $0.50/week). In addition, at least some of items 135 may also depreciate, expire, spoil and/or become obsolete. For example, in some embodiments, one or more of items 135 may be consumable or perishable products (e.g., food, drink, medicine, chemicals, etc.) that have expiration dates or shelf lives. Generally, a product's shelf life is associated with its quality, whereas the product's expiration is related to its safety (e.g., safe to use or consume). Accordingly, after the shelf life of a product has passed, it may still be safe (i.e., it may not have actually expired yet) although its quality is no longer guaranteed. As a practical matter, for some types of products, shelf lives and expiration dates may be used interchangeably.

When deciding how much inventory to purchase for a particular planning period, a merchant may attempt to balance the benefits of holding sufficient inventory to satisfy customer demand against the potential harm of holding too much inventory and incurring some of the costs outlined above. An "overage cost" for an item is the cost a merchant incurs by purchasing one more unit than would otherwise have been purchased if the exact demand for that item had been known. An "underage cost" of the same item is the cost that the merchant incurs by purchasing one fewer unit of the item than would be purchased if the exact demand were known. Ordering one more unit of the item generally increases the probability of overage and decreases the probability of underage, whereas ordering one less unit generally increases the probability of underage and decreases the probability of overage.

A merchant may attempt to minimize (or reduce) the underage and overage costs, at least during steady state periods. Inventory for an item may be purchased according to a critical ratio (CR). The critical ratio for a particular item is a parameter corresponding to the probability of remaining in stock for the item throughout a planning period given a demand forecast for the planning period. Using a higher value for critical ratio will typically result in a higher target inventory level, and a lower critical ratio value will typically lead to a lower target inventory level for the planning period. A purchasing plan may be produced for a particular item according to a particular critical ratio and demand forecast. The purchasing plan will indicate to a buy a quantity of the item to meet the corresponding target inventory level taking into account inventory already on hand or already on order. During "peak" periods, however, the merchant may choose to artificially adjust the critical ratio relative to steady state periods to account for demand variability and other factors; thus allowing a fulfillment system to effectively perform an "early stock up" of the item. Traditionally, the task of adjusting critical ratios has been an ad hoc process. A person in charge of a particular retail item may directly or indirectly make adjustments to CR as a tuning parameter to attempt to compensate for variability that may arise at different times during the year, such as during a holiday season. Once the appropriate CR is determined, it is then possible to calculate a re-order quantity based in part on the new CR and the demand forecast for the item.

Further refinements may be achieved by optimizing the intervals at which inventory is purchased. For example, purchasing plans that include more frequent, smaller inventory orders may provide improved performance. However, the merchant's purchasing plan may be constrained by the capabilities of the merchants' vendors. For example, a particular vendor may process received orders for a particular inventory item only at certain specific times (e.g., every Monday at 10 AM). Thus, efficacy of a purchasing plan may be improved by accurately accounting for such vendor-imposed constraints. Additional challenges may be imposed in cases where the vendor periodically changes the constraint (e.g., the vendor changes the order processing times).

Inventory Planning & Execution

Figure 2:
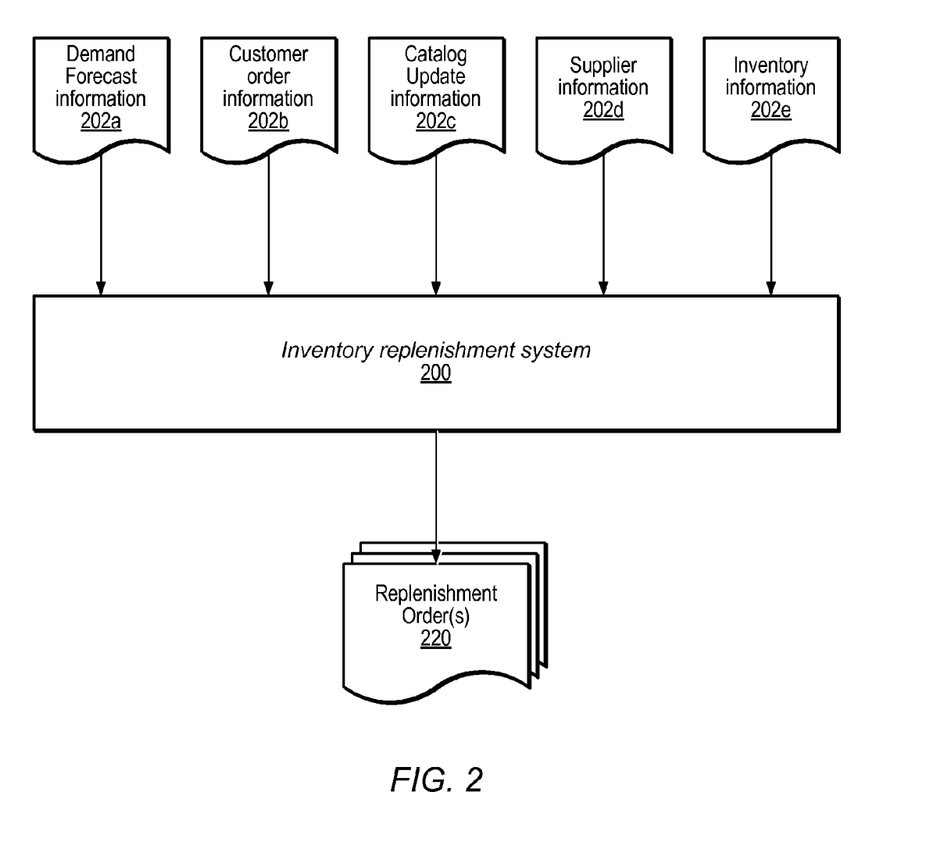
FIG. 2 is a block diagram of an inventory replenishment system configured to generate replenishment orders according to some embodiments.

FIG. 2 illustrates information flow in a inventory replenishment system according to one embodiment of the present disclosure. Embodiments of inventory replenishment system 200 may generate replenishment order 220 based on various data. For example, various inventory planning events may be automatically monitored and captured as triggers for prompting evaluation of a current state of an inventory item (e.g. in view of the captured inventory planning event). Examples of inventory planning events include demand forecast event 202a (e.g., updated forecasts, price changes, and other promotions that may impact demand), customer order event 202b (e.g., received customer orders, unfilled customer demand), catalog update event 202c (e.g., addition or deletion of a product offering), supplier event 202d (e.g., vendor schedule changes, vendor lead time changes, unfilled vendor orders), and inventory event 202e (e.g., inventory loss/damage). In various embodiments, these inventory planning events may include any event that provides cause to reevaluate the current inventory state for one or more inventory items.

As an illustrative example, consider a case in which a merchant has previously calculated target inventory levels and replenishment schedules for various sports-related apparel sold by the merchant. However, based on a given team enjoying a particularly successful season, demand for apparel related to that team may increase significantly. For example, a championship game appearance by a particular sports team may result in increased sales of jerseys and caps bearing that team's logo. Accordingly, an inventory planning event corresponding to an updated forecast (demand forecast event 202a) for apparel associated the sports team may be captured by inventory replenishment system 200. The captured inventory planning event may serve to trigger reevaluation of the current inventory state for various relevant inventory items, including caps and jerseys, in view of the updated forecast. New replenishment orders 220 may be generated based on the reevaluation of the current inventory state.

As another example, customer order event 202b indicating an increase in received orders that exceeds a set threshold value for a particular product may be captured by inventory replenishment system 200. Accordingly, evaluation of the current inventory state for the particular product may be triggered in response to the spike in orders. A replenishment order 220 may be generated based on the evaluation of the current inventory state. In some cases, evaluation may also result in a high priority being assigned to execution of the replenishment order to mitigate possible damage to the merchant's reputation that may result for slow order fulfillment.

Examples of catalog update event 202c include addition of a new product to a catalog, and removal of a previously existing item from a catalog. Addition of a new product may trigger evaluation of an inventory state that results in replenishment order 220 reflecting stock-up purchasing of the new inventory item. Removal of an item from a catalog may trigger evaluation of an inventory state that results in cancellation of previously scheduled replenishment orders for the removed product.

An example of supplier event 202d includes receipt of a change in a vendor's schedule for processing received orders. For example, consider a scenario in which a vendor that previously processed orders only once per week migrates to a system in which the vendor processes orders daily. A merchant that orders replenishment inventory from that vendor may be able to benefit greatly by adjusting to a replenishment schedule that reflects smaller, more frequent inventory item replenishment orders (e.g. migrating from weekly to daily frequency). Supplier event 202d reflecting the new vendor order schedule may be captured by inventory replenishment system 200, and resulting evaluation of the current inventory state for the vendor-supplied product in view of the new vendor order schedule may result in replenishment order 220 that corresponds to daily replenishment instead of weekly replenishment.

An example of inventory event 202e includes receipt of a report of damaged inventory within a fulfillment center. Such a Inventory event 202e may result evaluation of the current inventory state to determine that replenishment order 220 is needed to replace the damaged inventory in order to maintain desired performance at the fulfillment center.

Figure 3:
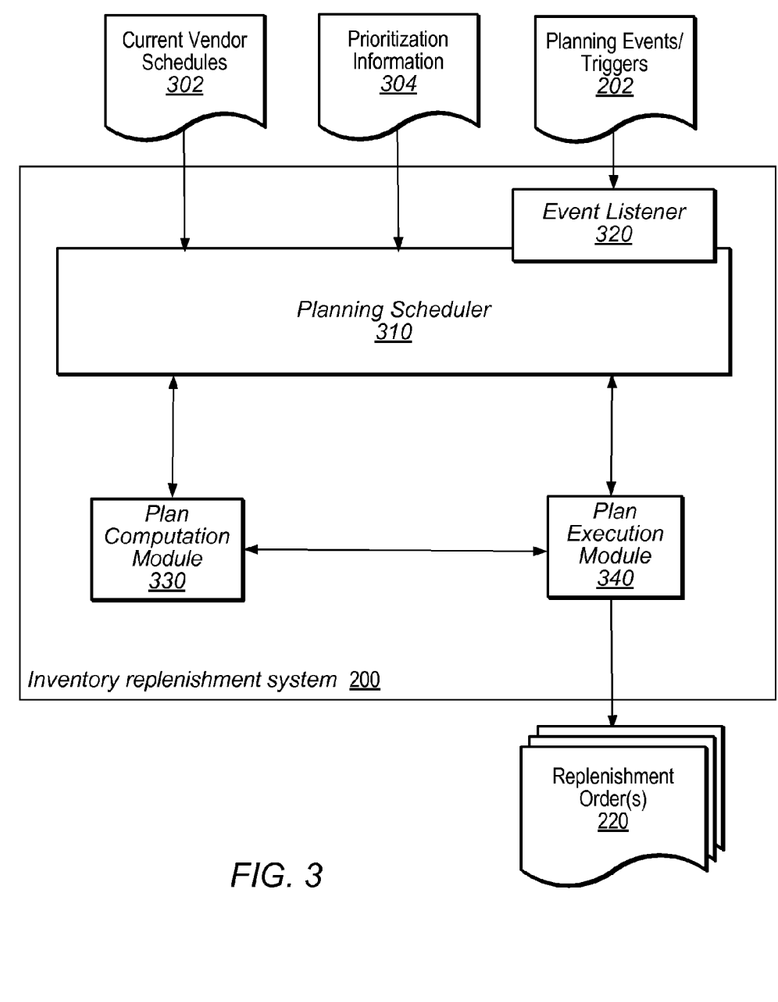
FIG. 3 is a block diagram illustrating various aspects of inventory replenishments systems according to various embodiments.
Figure 4:
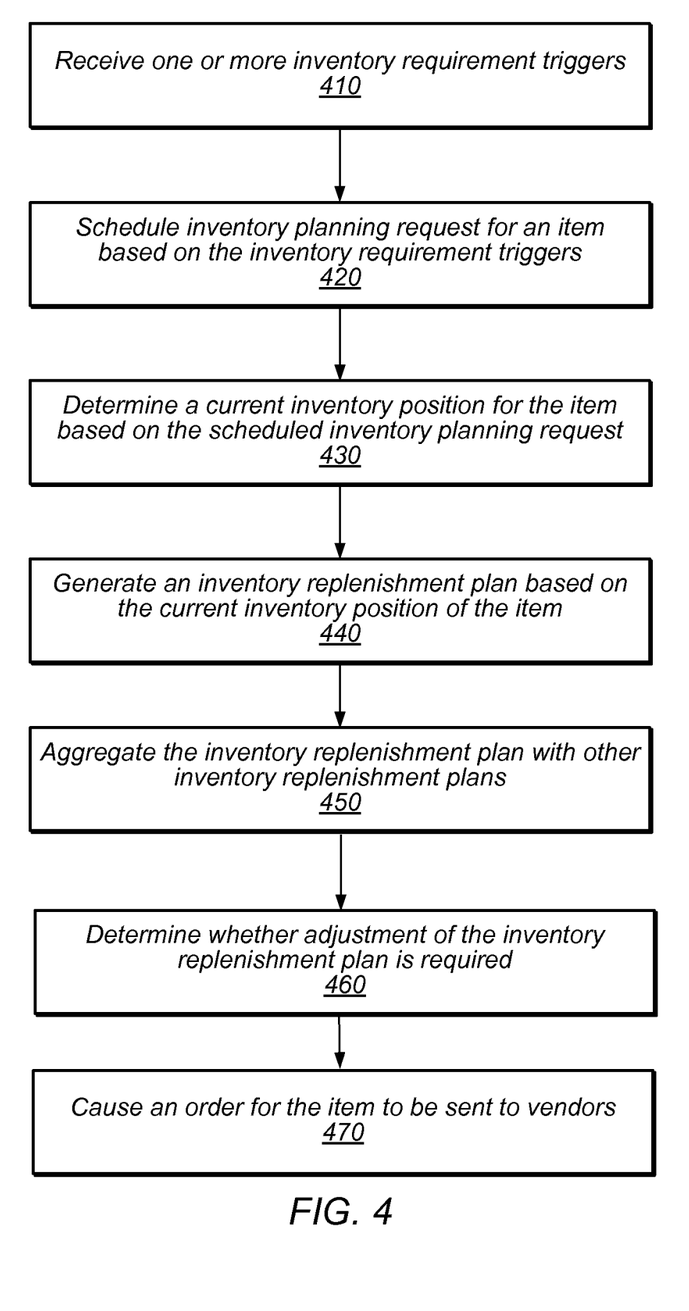
FIG. 4 is a flow diagram of a method for continuous inventory planning review according to various embodiments of the present disclosure.

Turning now to FIG. 3, additional aspects found in some embodiments of inventory replenishment system 200 are illustrated. As shown, inventory replenishment system 200 may include planning scheduler 310, event listener 320, plan computation module 330, and plan execution module 340, which in some cases may each be implemented as software modules. Referring also to FIG. 4, event listener 320 may be configured to monitor for various planning event/trigger 202, such as demand forecast event 202a, customer order event 202b, catalog update event 202c, supplier event 202d, and inventory event 202e as discussed in the above examples (see 410). In various embodiments, event listener 320 may be configured to passively monitor for indications of planning events/triggers 202 that are passed to event listener 320 (e.g., addressed to event listener 320). In some embodiments, event listener 320 may actively poll various components to detect indications of planning event/trigger 202. In response to receiving indications of one or more planning event/trigger 202, event listener 320 may notify planning scheduler 310 of the received trigger.

Based on the indications of one or more planning event/trigger 202, one or more inventory planning requests may be scheduled (see 420). For example, a received planning event indicating increased demand for back-to-school items at the end of summer may cause scheduling of inventory planning requests for various inventory items such as backpacks, notebooks, etc. The scheduling may employ various techniques such as, for example, first-in-first-out, scheduling based on priorities associated with the particular planning event/trigger 202, and scheduling based on vendor order processing schedules. Continuing with the example, planning scheduler 310 may schedule an inventory planning request for Backpack Model 1 from Vendor A for evaluation as soon as possible, due to a planning event/trigger indicating unfilled existing customer demand. In contrast, an inventory planning request for notebook paper may be scheduled for delayed evaluation based on an inventory planning event/trigger indicting routine, periodic assessment of inventory need.

Execution of a scheduled inventory planning request (e.g., by plan computation module 330) may cause a current inventory position (e.g., a current inventory state in view of the inventory planning request) to be determined for a particular inventory item (see 430). For example, determination of a current inventory position for Backpack Model 1 from Vendor A may include consideration of factors such as unfilled demand (e.g., indicated by the inventory planning request), forecasted demand, uncommitted inventory, in-progress replenishment orders, vender processing schedules, and vendor lead times. Based on the determined current inventory position, an inventory replenishment plan (e.g., a proposed replenishment order) may be generated for the inventory item (see 440). In some cases, a particular inventory item may be available from a plurality of different vendors. In some such cases, generation of an inventory replenishment plan may include selecting one or more vendors from the plurality of different vendors. Selecting the one or more vendors my be based on various factors, such as price-related factors (e.g., unit cost, contractual obligations) and fulfillment-related factors (e.g., availability, lead time).

The inventory replenishment plans may in some cases be stored for scheduled execution (e.g., by plan execution module 340). In some embodiments, the inventory replenishment plans may include an indication of priority for execution scheduling purposes. Scheduling may also be dependent on business constraints, such vendor order processing schedules. In various embodiments, inventory replenishment plans are aggregated with other inventory replenishment plans for further evaluation (see 450). Continuing with the example, an inventory replenishment plan for Backpack Model 1 from Vendor A may be aggregated with various replenishment plans for other backpack models from Vendor A, or from other vendors.

In some cases, execution of the aggregated replenishment plans includes reevaluation the aggregated replenishment plans (e.g., by plan execution module 340) to determine whether adjustment is required in view of the aggregation of replenishment plans (see 460). For example, a fulfillment center may have sufficient capacity to receive and store a replenishment quantity associated with the replenishment plan for Backpack Model 1 from Vendor A in the example above. However, the aggregation of the replenishment plan with other replenishment plans for various other backpack models from Vendor A may result in the aggregate replenishment quantity of backpacks (e.g., the sum of the various backpack replenishment orders) exceeding the intake capacity or the storage capacity at the fulfillment center. In such a case, individual ones of the replenishment plans may be adjusted (e.g., proportionately, or disproportionately based on priority or other various criteria) to accommodate the capacity of the fulfillment center.

Execution of the aggregated replenishment plans may also include causing replenishment order 220 to be sent to appropriate vendors (see 470). Inventory replenishment plan execution (e.g., by plan execution module 340) may be decoupled from inventory replenishment plan generation (e.g., by plan computation module 330), thereby allowing scheduling of the generation of the inventory replenishment plan for a time that is beneficial for system load balancing, while allowing execution of the inventory replenishment plan at a time that is optimal based on the vendor order processing schedule, or based on other factors. Inventory replenishment plan execution may in some instances further include updating some or all of the values previously calculated during the inventory replenishment plan generation. Current vendor schedules 302 and prioritization information 304 may in some cases be periodically or constantly updated and referenced during plan generation and plan execution to facilitate real-time accuracy with regarding to changing business rules, such as vendor order processing schedules and merchant prioritizations. Thus, some embodiments may provide the ability to react to, for example, changing vendor schedules or changing vendor constraints in real time by adjusting plan generation and/or plan execution accordingly.

In the preceding exemplary description, reference is made to specific features of FIG. 4 vis-à-vis specific structures illustrated in FIG. 3 for illustrative purposes. In some embodiments, the features illustrated in FIG. 4 may be performed by different structures. For example, in some embodiments, planning scheduler 310 may perform each of 410, 420, 430, 440, 450, 460, and 470.

Example System

Figure 5:
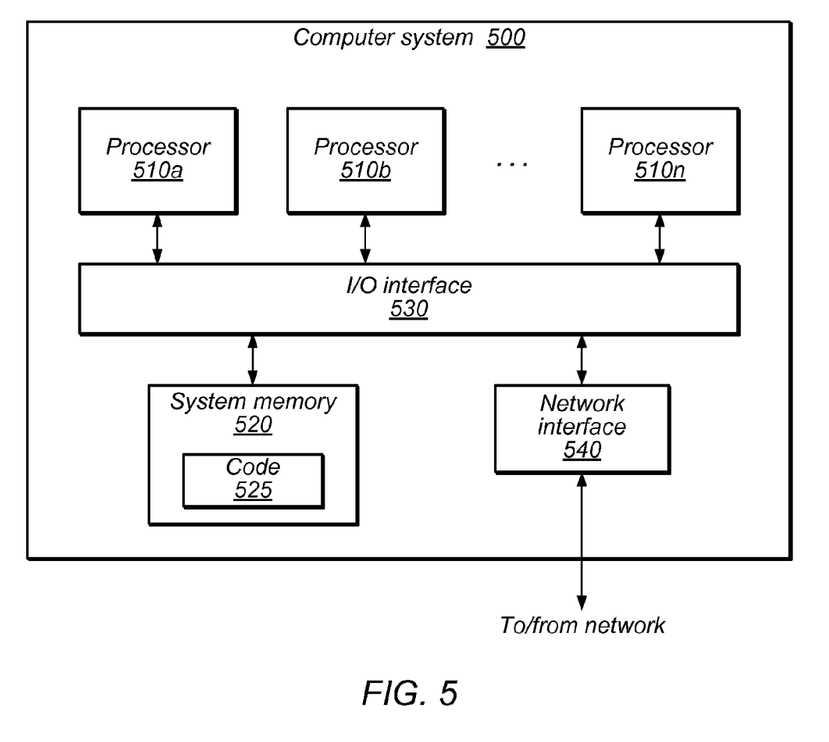
FIG. 5 is a block diagram illustrating a computer system according to various embodiments of the present disclosure.

An embodiment of a computer system including computer-accessible media is illustrated in FIG. 5. As illustrated, computer system 500 includes one or more processors 510 coupled to a system memory 520 via an input/output (I/O) interface 530. Computer system 500 further includes a network interface 540 coupled to I/O interface 530. In some embodiments, inventory replenishment system 200 may be implemented using a single instance of computer system 500, while in other embodiments multiple such systems may be configured to host different portions or instances of a planning system. Moreover, in some embodiments, some data sources or services (e.g., current vendor schedules, prioritization information, plan computation module, plan execution module) may be implemented via instances of computer system 500 that are distinct from those instances implementing other data sources or services (e.g., planning scheduler).

In various embodiments computer system 500 may be a single processor system including one processor 510, or a multiprocessor system including several processors 510 (e.g., two, four, eight, or another suitable number). Processors 510 may be any suitable processor capable of executing instructions. For example, in various embodiments processors 510 may be a general-purpose or embedded processor implementing any of a variety of instruction set architectures (ISAs), such as the x96, PowerPC, SPARC, or MIPS ISAs, or any other suitable ISA. In multiprocessor systems, each of processors 510 may commonly, but not necessarily, implement the same ISA.

System memory 520 may be configured to store instructions and data accessible by process 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 520 as code 525.

In one embodiment, I/O interface 530 may be configured to coordinate I/O traffic between processor 510, system memory 520, and any peripheral devices in the device, including network interface 540 or other peripheral interfaces. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network, such as other computer systems, for example. In various embodiments, network interface 540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 520 may be one embodiment of a computer-accessible medium configured to store program instructions and data as described above. However, in other embodiments, program instructions and/or data may be received, sent or stored upon different types of computer-accessible media. Generally speaking, a computer-accessible medium may include storage media or memory media such as magnetic or optical media—e.g., disk or CD/DVD-ROM coupled to computer system 500 via I/O interface 530. A computer-accessible medium may also include any volatile or non-volatile media such as RAM (e.g., SDRAM, DDR SDRAM, RDRAM, SRAM, etc.), ROM, etc, that may be included in some embodiments of computer system 500 as system memory 520 or another type of memory. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 540.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method, comprising:
performing, by one or more computers of an inventory replenishment system of a merchant:
in response to receiving an indication of one or more inventory requirement triggers, automatically scheduling, by the inventory replenishment system of the merchant, an inventory planning request for a particular inventory item, wherein the inventory planning request is a request to generate a replenishment plan for the particular inventory item;
wherein said scheduling is based on one or more ordering deadlines associated with the particular inventory item, wherein the one or more ordering deadlines are specified by one or more vendors that supply the particular inventory item to the merchant;
in accordance with the scheduled inventory planning request, automatically generating, by the inventory replenishment system of the merchant, a particular inventory replenishment plan based on the merchant's current inventory position of the particular inventory item;
storing, by the inventory replenishment system of the merchant, the particular inventory replenishment plan; and
executing, by the inventory replenishment system of the merchant, the particular inventory replenishment plan, said executing comprises sending an order for the particular inventory item to the one or more vendors that supply the particular inventory item to the merchant, wherein said executing includes:
aggregating the particular inventory replenishment plan and one or more other inventory replenishment plans, wherein the particular inventory replenishment plan and one or more other inventory replenishment plans are generated by the inventory replenishment system of the same merchant; and
determining whether adjustment of the particular inventory replenishment plan is required based on aggregation of the particular inventory replenishment plan and the one or more other inventory replenishment plans.

2. The method of claim 1, wherein said executing the particular inventory replenishment plan is performed according to a schedule associated with an ordering deadline for a vendor of the particular inventory item.

3. The method of claim 1, wherein the one or more other inventory replenishment plans includes at least one replenishment plan for an inventory item that is different from the particular inventory item.

4. The method of claim 1, wherein said determining whether adjustment of the particular inventor replenishment plan is required includes determining whether aggregation of the particular inventory replenishment plan and the one or more other inventory replenishment plans exceeds a fulfillment center receiving capacity.

5. The method of claim 1, wherein said scheduling an inventory planning request is based on a priority associated with the one or more inventory requirement triggers.

6. The method of claim 1,
wherein the automatically generated particular inventory replenishment plan includes an indication of a priority associated with executing the particular inventory replenishment plan; and
wherein said executing the particular inventory replenishment plan is performed according to a schedule that is based at least in part on the indication of the priority.

7. An inventory replenishment system of a merchant, comprising:
at least one processor; and
memory coupled to the at least one processor, wherein the memory stores program instructions that are executable by the system of the merchant to cause the system to perform operations comprising:
scheduling, by the inventory replenishment system of the merchant, an inventory planning request for a particular inventory item in response to receiving an indication of one or more inventory requirement triggers, wherein the inventory planning request is a request to generate a replenishment plan for the particular inventory item;
automatically generating, by the inventory replenishment system of the merchant, a particular inventory replenishment plan based on the merchant's current inventory position of the particular inventory item, wherein said automatically generating is performed in accordance with the scheduled inventory planning request;
scheduling, by the inventory replenishment system of the merchant, execution of the particular inventory replenishment plan separate from said scheduling the inventory planning request to generate the replenishment plan for the particular inventory item, thereby decoupling generation and execution of the generated replenishment plan from each other; and
executing, by the inventory replenishment system of the merchant and in accordance with said scheduling execution of the particular inventory replenishment plan, the scheduled particular inventory replenishment plan, said executing comprises sending an order for the particular inventory item to one or more suppliers that supply the particular inventory item to the merchant.

8. The system of claim 7, wherein the executing the scheduled particular inventory replenishment plan includes:
determining whether adjustment of the particular inventory replenishment plan is required based on aggregation of the particular inventory replenishment plan and one or more other inventory replenishment plans.

9. The system of claim 8, wherein said determining whether adjustment of the particular inventor replenishment plan is required includes determining whether the aggregation of the particular inventory replenishment plan and the one or more other inventory replenishment plans exceeds a factory receiving capacity.

10. The system of claim 8, wherein the one or more other inventory replenishment plans includes at least one replenishment plan for an inventory item that is different from the particular inventory item.

11. The system of claim 10, wherein the particular inventory item and the inventory item that is different are members of a same product category.

12. The system of claim 7, wherein said scheduling an inventory planning request for a particular inventory item includes scheduling based on a supplier's order processing schedule.

13. The system of claim 7, wherein said scheduling an inventory planning request for a particular inventory item includes scheduling based on a priority associated with the inventory planning request.

14. The system of claim 7, wherein said scheduling the particular inventory replenishment plan includes scheduling based on a supplier's order processing schedule.

15. The system of claim 7, wherein said scheduling the particular inventory replenishment plan includes scheduling based on a priority associated with the inventory planning request.

16. An article of manufacture comprising a non-transitory computer-readable storage medium having instructions stored thereon that, responsive to execution by a computer system, cause the computer system to perform operations comprising:
receiving, by an inventory replenishment system of the merchant, an indication of one or more inventory requirement triggers;
scheduling, by the inventory replenishment system of the merchant, an inventory planning request for a particular inventory item based on the received indication of the one or more inventory requirement triggers, wherein the inventory planning request is a request to generate a replenishment plan for the particular inventory item;
automatically generating, by the inventory replenishment system of the merchant, a particular inventory replenishment plan based on the merchant's current inventory position of the particular inventory item, wherein said automatically generating is performed in accordance with the scheduled inventory planning request;
scheduling, by the inventory system of the merchant, the particular inventory replenishment plan separate from said scheduling an inventory planning request to generate the replenishment plan for the particular inventory item, thereby decoupling generation and execution of the generated replenishment plan from each other; and
executing, by the inventory replenishment system of the merchant and in accordance with said scheduling execution of the particular inventory replenishment plan, the scheduled particular inventory replenishment plan, said executing comprises sending an order for the particular inventory item to one or more vendors that supply the particular inventory item to the merchant.

17. The article of manufacture of claim 16, wherein said automatically generating a particular inventory replenishment plan based on a current inventory position includes causing the current inventory position to be determined.

18. The article of manufacture of claim 16, wherein said scheduling an inventory planning request for a particular inventory item includes:
determining one or more order deadlines associated with one or more vendors of the particular inventory item; and
determining a schedule for the inventory planning request based on the one or more order deadlines.

19. The article of manufacture of claim 16, wherein said scheduling an inventory planning request for a particular inventory item includes scheduling based on:
a priority assigned to the inventory requirement trigger; and
balancing scheduling demands at the computer system.

20. The article of manufacture of claim 16, wherein said scheduling the particular inventory replenishment plan includes:
   determining one or more order deadlines associated with one or more vendors of the particular inventory items; and
   determining a schedule for the particular inventory replenishment plan based on the one or more order deadlines.

21. The article of manufacture of claim 16, wherein the operations further comprise:
   determining a plurality of inventory planning requests based on a first of the one or more inventory requirement triggers, wherein at least two of the plurality of inventory planning requests are for different inventory items.

* * * * *